US008072375B2

(12) United States Patent
Trautenberg

(10) Patent No.: US 8,072,375 B2
(45) Date of Patent: Dec. 6, 2011

(54) METHOD AND APPARATUS FOR INTEGRITY COMMUNICATION IN A NAVIGATION SATELLITE SYSTEM

(75) Inventor: Hans L. Trautenberg, Ottobrunn (DE)

(73) Assignee: Astrium GmbH, Taufkirchen (DE)

( * ) Notice: Subject to any disclaimer, the term of this patent is extended or adjusted under 35 U.S.C. 154(b) by 175 days.

(21) Appl. No.: 12/634,295

(22) Filed: Dec. 9, 2009

(65) Prior Publication Data

US 2010/0141512 A1 Jun. 10, 2010

(30) Foreign Application Priority Data

Dec. 10, 2008 (DE) .......................... 10 2008 061 276

(51) Int. Cl.
G01S 19/02 (2010.01)
(52) U.S. Cl. ................................. 342/357.395
(58) Field of Classification Search ........... 342/357.395, 342/357.58
See application file for complete search history.

(56) References Cited

U.S. PATENT DOCUMENTS

2008/0007452 A1    1/2008   Damidaux et al.

FOREIGN PATENT DOCUMENTS

EP    1 728 092 B1   12/2006

OTHER PUBLICATIONS

Carlos Hernández Medel et al., "The Galileo Ground Segment Integrity Algorithms: Design and Perfoemance", International Journal of Navigation and Observation, Apr. 17, 2008, pp. 1-16, vol. 2008, Hindawi Publishing Corporation.

Johannes Mach et al., "Making GNSS Integrity Simple and Efficient—A New Concept Based on Signal-in-Space Error Bounds", pp. 1-12.
German Office Action dated Aug. 10, 2009 with English Translation (Eight (8) pages).
European Search Report with partial English translation dated Oct. 18, 2010 (seven (7) pages).
Oehler et al., The Galileo Integrity Concept, ION GNSS, International Technical Meeting of the Satellite Division of the Institute of Navigation, Sep. 21, 2004, Washington, DC, pp. 604-615, XP-002375520.
Hernandez et al., GALILEO Integrity:The Ground Segment Computation Algorithm Perspective, ION GNSS, International Technical Meeting of the Satellite Division of the Institute of Navigation, Sep. 26, 2006, Washington, DC, pp. 2634-2645, XP-002521139.

*Primary Examiner* — Thomas Tarcza
*Assistant Examiner* — Fred H Mull
(74) *Attorney, Agent, or Firm* — Crowell & Moring LLP

(57) ABSTRACT

For integrity communication, a navigation satellite system has a space segment with satellites that emit navigation signals for reception and analysis by user systems, and a ground segment with observation stations that monitor the satellites. The ground segment controls cause distribution of integrity information concerning the satellites to user systems with the navigation signals. The integrity information has a first SISMA value and a second broadcast SISMA value for the accuracy of the satellite monitored by the ground segment. The second broadcast SISMA value takes into account a failure of an observation station of the ground segment, and a threshold value for the second broadcast SISMA value is provided. The threshold value with the integrity information for a satellite is transmitted instead of the second broadcast SISMA value when the latter exceeds the threshold value and the first SISMA value is lower than the threshold value for the satellite. The integrity information to be transmitted when the second broadcast SISMA value and the first SISMA value for the satellite each exceed the threshold value.

4 Claims, 2 Drawing Sheets

METHOD AND APPARATUS FOR INTEGRITY COMMUNICATION IN A NAVIGATION SATELLITE SYSTEM

BACKGROUND

This application claims the priority of German patent document no. 10 2008 061 276.6-55, filed Dec. 10, 2008, the disclosure of which is expressly incorporated by reference herein.

The invention relates to a method and apparatus for integrity communication in a navigation satellite system.

Satellite systems for worldwide navigation, referred to as GNSS (Global Navigation Satellite System, abbreviated navigation satellite system) are used for position determination on the ground and in the air. GNSS systems, such as the European Navigation Satellite System (also called the Galileo System, or simply "Galileo", which is currently under construction, include a satellite system (space segment) comprising a plurality of satellites, and an earth-fixed reception equipment system (ground segment). The latter is connected with a central computation station and comprises several ground stations as well as Galileo sensor stations (GSS) and user systems which analyze and use the satellite signals transmitted from the satellites by radio particularly for the navigation. Each satellite in the space segment emits a signal, referred to as the signal-in-space (SIS) characterizing the satellite. In particular, the SIS comprises information concerning the orbit of the satellite and a time stamp of the emission point in time; the latter are used for detecting the position of a user or user system.

Accurate detection of the position of a user requires integrity in the case of a GNSS, meaning that, on the one hand, the GNSS is capable of warning a user within a defined time period when parts of the GNSS should not be used for the navigation (for example, in the event of a failure of system components), and on the other hand that the user can trust the navigation data, which the user receives from the satellites of the GNSS by way of satellite navigation signals, and particularly can rely on the accuracy of the received navigation data.

In the integrity concept of the Galileo, the following information is transmitted to user systems in the form of navigation signals:

The predicted accuracy of the transmitted navigation signal for each satellite (i.e., a signal-in-space accuracy (SISA) of satellites as a quality measurement for an SIS of a satellite);

Status reports concerning the predicted accuracy of the satellite signal monitoring by the ground segment (i.e., a signal-in-space monitoring accuracy (SISMA) for each satellite); and An integrity signal in the form of a simple error flag for a faulty SIS of a satellite "Not OK" (the so-called integrity flag IF), and the threshold value for the report that the error of an SIS of a satellite is no longer acceptable (also called an IF threshold). In this case, the IF threshold may be a function of the SISA and the SISMA.

This information enables the user system itself to quantify and evaluate the integrity and the integrity risk.

In Galileo, the signals in space of the satellites are monitored within the ground segment by analyzing the measurements from the individual Galileo sensor stations (GSS). The measurements of the GSS are processed in a central integrity processing center of the ground segment in order to determine the above-listed integrity information to be distributed to the user systems.

Based on the known positions of the GSS in the integrity processing center, the current position of a satellite, the time momentarily physically implemented in the satellite and the quality of the emitted signal, and thus the error of the satellite or of the signal in space (the so-called signal-in-space error, or "SISE") emitted by the satellite are estimated.

A prediction of the distribution of the SISE can be derived from a normal distribution with the smallest standard deviation. This representation can take place, for example, in accordance with the overbounding. This prediction is designated as the above-mentioned signal-in-space accuracy (SISA) which is distributed by the ground segment by way of the satellites of the space segments to the user systems. In the above-mentioned sense, the difference between the current 4-dimensional position (orbit and time of day) of a satellite and the predicted 4-dimensional position contained in the navigation message, can be described by means of the SISA.

However, estimating the SISE is a process prone to errors. As a rule, it is therefore assumed that the distribution of the actual SISE about the value of the estimated SISE can be described by a normal distribution, with the standard deviation which is indicated as the above-mentioned signal-in-space monitoring accuracy (SISMA). The SISMA is therefore a measurement for the accuracy of the estimation of the SISE for a satellite in the ground segment, and is also transmitted, from the ground segment to the user systems by way of the satellites of the space segment SISMA. In Galileo, the SISMA values for the satellites are transmitted approximately every 30 seconds. In order to reduce the integrity risk to the extent possible, the highest SISMA value of the respective SISMA values predicted in a measuring period is transmitted for each satellite. In this case, a high SISMA value indicates a low accuracy of satellite monitoring by the ground segment, and thus reflects an increased integrity risk for a user.

Furthermore, when determining the SISMA of a satellite whose navigation signals are measured by several GSSs, the failure of precisely one GSS of the GSSs provided for the measuring can be taken into account, so that the SISMA value is increased again because the measuring accuracy suffers from the failure. For differentiation from the conventional SISMA, a SISMA determined in this manner is called a broadcast SISMA. More precisely, the broadcast SISMA is a function of the measurements of the GSSs visible from the satellite and made available to the integrity processing center of the ground segment, and is computed with the assumption that the GSS is no longer providing data whose loss would cause the broadcast SISMA to rise the most. This leads to a very dense network of GSSs. In addition, very high broadcast SISMA values may be transmitted because the failure of one GSS is assumed, so that many user systems will classify the integrity risk as very high, and will possibly no longer use the GNSS, despite the fact that the actual SISMA has a much lower value and integrity would exist.

In order to avoid the above problems, it has been suggested to define in each case a maximal value in the form of a threshold value for the broadcast SISMA values, which threshold value is virtually never exceeded. However, this technique may cause a user system to underestimate its integrity risk and therefore erroneously to classify received navigation signals (and the information contained therein) as having integrity, specifically when actually a broadcast SISMA larger than the maximal value would have to be sent and the SISMA is also above this threshold value. In addition, by restricting the broadcast SISMA by an upper limit, the continuity risk will rise because it is no longer ensured in every case that, when a GSS fails, the user can continue to use for a defined time the SISMA being used by the user, because this loss had no longer been taken into account in the SISMA transmitted to the user.

SUMMARY OF THE INVENTION

It is therefore an object of the present invention to provide a method and apparatus for integrity communication in a navigation satellite system which reduces or avoids underestimating of the integrity risk.

This and other objects and advantages are achieved by the process and system for integrity communication in a navigation satellite system according to the invention, which use not only a predefined threshold value for the transmission of the broadcast SISMA for a satellite, but also the SISMA of the satellite in order to avoid, to the extent possible, underestimation of the integrity risk by a user or a use system. According to the present invention, both the broadcast SISMA value and the SISMA value are compared with the threshold value for this purpose. Based on the results of the comparison, a more accurate decision can then be made as to what is to follow as the next process step: Either the broadcast SISMA or the threshold value is transmitted; or the integrity information to be transmitted is changed.

One embodiment of the invention provides a process for integrity communication in a navigation satellite system that includes a space segment having several satellites that emit navigation signals for reception and analysis by user systems for position determination, and a ground segment with several observation stations that monitor the satellites. The ground segment controls the integrity communication so that it distributes integrity information concerning the satellites to user systems with the navigation signals.

The integrity information for a satellite has a first SISMA value and a second broadcast SISMA value for the accuracy of the satellite monitoring by means of the ground segment. In contrast to the first SISMA value, the second broadcast SISMA value takes into account the failure of an observation station of the ground segment, and a threshold value for the second broadcast SISMA value is provided.

The process according to the invention includes the following steps:
 transmitting the threshold value with the integrity information for a satellite instead of the second broadcast SISMA value when the latter exceeds the threshold value and the first SISMA value is lower than the threshold value for the satellite, and
 changing the integrity information to be transmitted as soon as the second broadcast SISMA value and the first SISMA value for the satellite each exceed the threshold value.

The change of the integrity information may, for example, feature the marking of the satellite as "not monitored" in the integrity information, and it may also feature the increase of the first SISMA value for the satellite with the integrity information.

A further embodiment of the invention provides a system for integrity communication in a navigation satellite system that includes a space segment having several satellites that emit navigation signals for reception and analysis by use systems for position determination, and a ground segment with several observation stations that monitor the satellites. The system is configured for controlling the integrity communication so that it distributes integrity information concerning the satellites to user systems with the navigation signals.

The integrity information for a satellite has a first SISMA value and a second broadcast SISMA value for the accuracy of the satellite monitoring by means of the ground segment.

In contrast to the first SISMA value the second broadcast SISMA value, takes into account the failure of an observation station of the ground segment; and a threshold value for the second broadcast SISMA value is provided.

The system is constructed to carry out the steps of:
 transmitting the threshold value with the integrity information for a satellite instead of the second broadcast SISMA value when the latter exceeds the threshold value and the first SISMA value is lower than the threshold value for the satellite, and
 changing the integrity information to be transmitted as soon as the second broadcast SISMA value and the first SISMA value for the satellite each exceed the threshold value.

The terms used in the attached list of reference symbols and the assigned reference symbols are used in the description, in the claims, in the abstract and in the drawings.

Other objects, advantages and novel features of the present invention will become apparent from the following detailed description of the invention when considered in conjunction with the accompanying drawings.

DETAILED DESCRIPTION OF THE DRAWINGS

In the following, identical and/or functionally identical elements may be provided with the same reference symbols.

Figure 1:
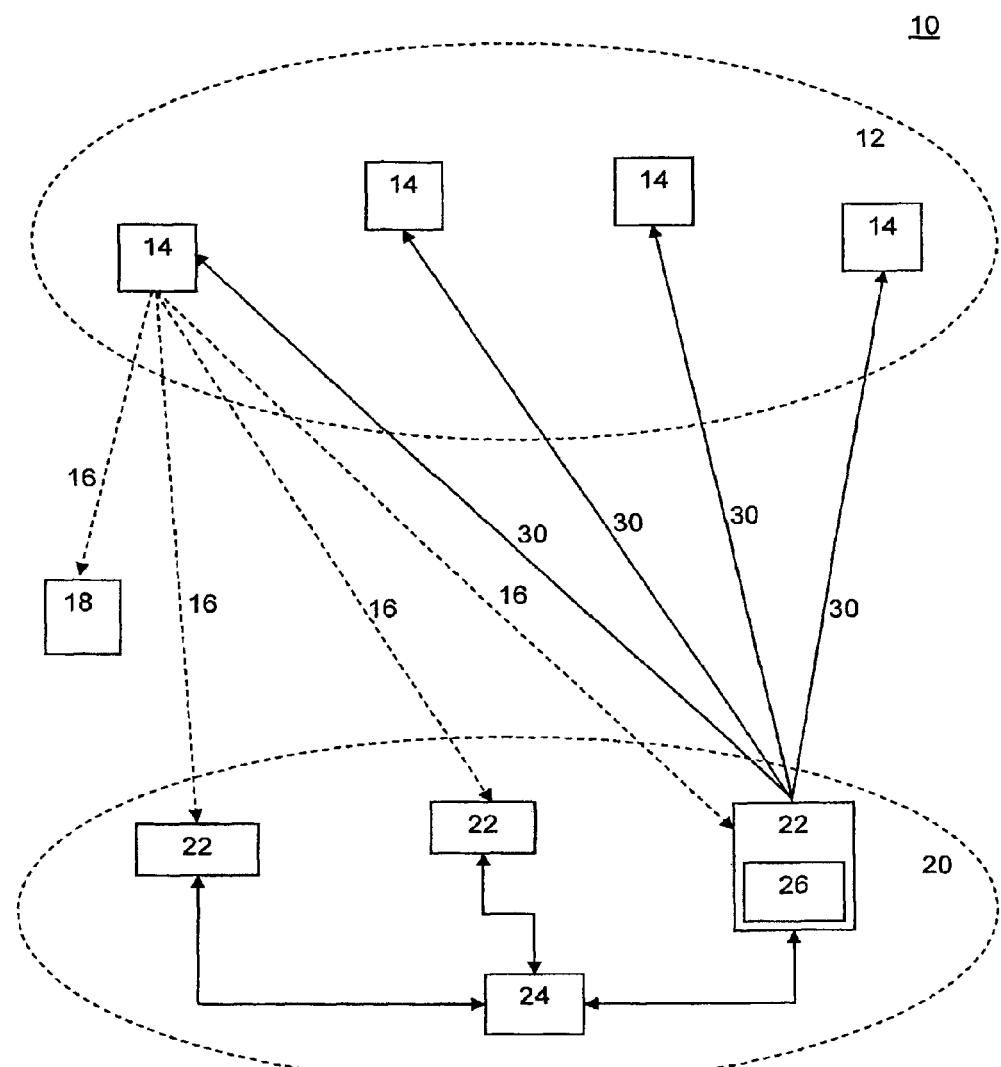
FIG. 1 is a view of a navigation satellite system with an embodiment of a system for integrity communication according to the invention.

FIG. 1 illustrates a navigation satellite system 10 having a space segment 12 and a ground segment 20. The space segment 12 comprises several satellites 14 which each orbit around the ground segment 20. Each satellite emits navigation signals 16 (SIS) which can be received by user systems 18, such as mobile navigation equipment, as well as by observation stations 22 of the ground segment 20. The observation stations 22 are provided particularly for monitoring the satellites 14 and coordinating, for example, integrity communication in the navigation satellite system 10. They therefore correspond to the initially mentioned Galileo sensor stations. The observation stations evaluate the received navigation signals 16 by checking the data of a satellite 14 transmitted with each navigation signal 16, particularly the orbit and point in time of the generating of the signal as well as the signal structure.

In addition, the observation stations 22 are coupled in communication with a central control station 24, in which all measuring data of the observation stations 22 converge and are evaluated. The central control station 24 also includes central integrity processing by which the integrity of the measuring data received from the observation stations is determined and controlled corresponding to the integrity communication in the navigation satellite system 10. The control station 24 also controls the transmission of integration information 30 to the satellites 14 by way of observation stations 22. For this purpose, the control station 24 can control transmission devices 26 in an observation station 22 so that they transmit integrity information 30 to the satellites 14, particularly to the SIS emitted by the satellites, concerning the satellites 14 to the use systems 18.

As in the case of the Galileo, the integrity information 30 contains information about the condition of a satellite or about the condition of the SIS 16 emitted by the satellite, particularly an integrity flag IF, which can indicate the status of a satellite as "don't use", "not monitored" or "OK", with a corresponding SISMA value. In order to minimize the integrity risk of a user or user system 18, in Galileo, the SISMA value of each satellite 14 of the space segment 12 (specifically, in each case the highest SISMA value from a measuring period of the signals SIS 16 of a satellite) is transmitted approximately every 30 seconds. Furthermore, the integrity information 30 contains a second value with respect to the initially mentioned broadcast SISMA value.

Under normal conditions, this second value is the broadcast SISMA value which, in contrast to the SISMA value, also takes into account the failure of the observation station 22 whose loss would cause the first SISMA value to rise the most. For the user and user systems respectively, the broadcast SISMA therefore represents the worst case, and is therefore more pessimistic than the SISMA value. The SISMA broadcast value may also become so large that the users and user systems classify the integrity risk as so high that they no longer use the navigation satellite system 10 although sufficient integrity would virtually exist (because, for example, no observation station at all has failed).

In order to avoid this problem, a threshold value can be provided as a defined maximal value for the broadcast SISMA value. When the broadcast SISMA value exceeds this threshold value, instead of the broadcast SISMA value, the threshold value is transmitted with the integrity information. This, in turn, leads to the risk that a user and/or user system may underestimate their integrity risk because the actual SISMA value may be greater than the threshold value. As a result of the received integrity information and the threshold value as a replacement for the broadcast SISMA value, in this case, a user and use system respectively would trust the navigation information, and assume integrity although there actually is a very high integrity risk.

Figure 2:
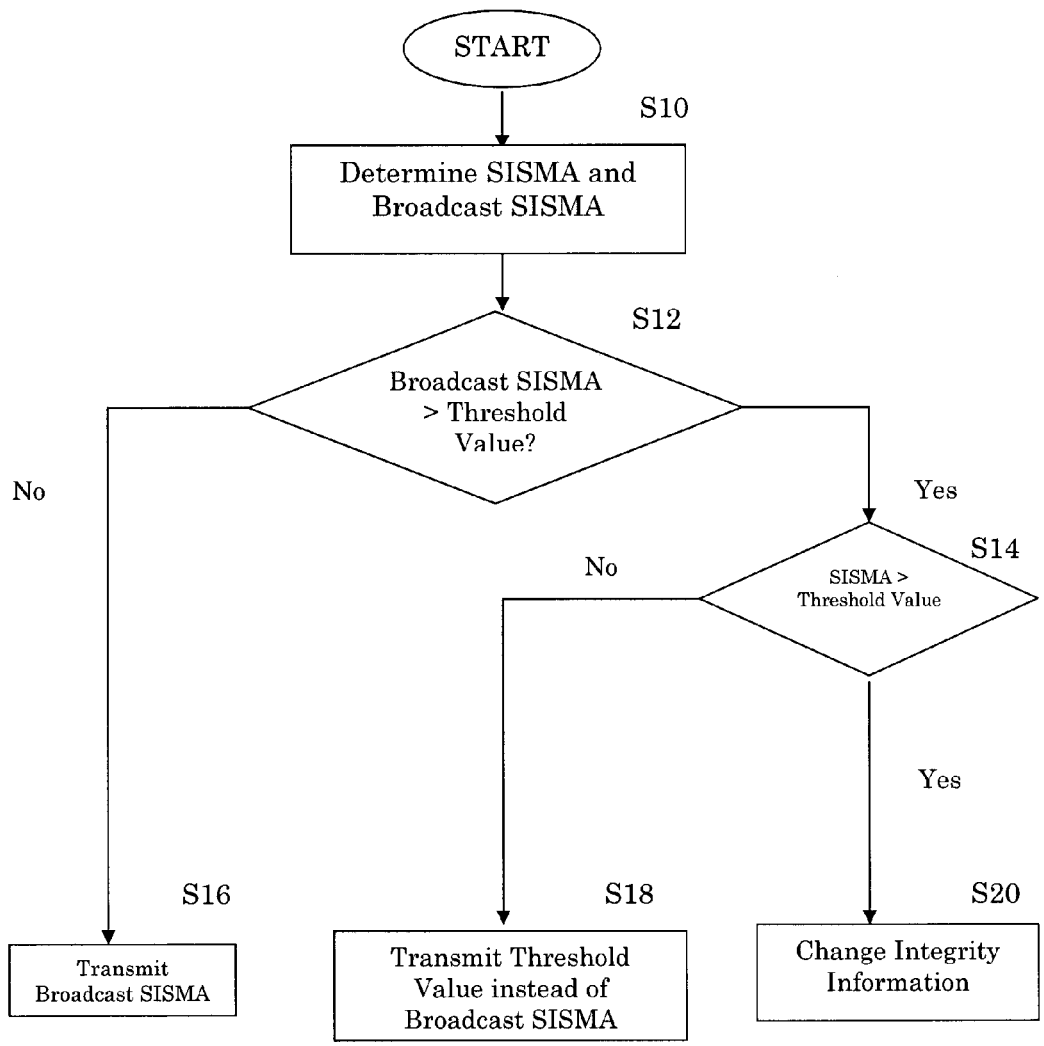
FIG. 2 is a flow chart of an embodiment of the process for integrity communication according to the invention.

This is true, particularly where the present invention starts; that is, the process outlined in the flow chart of FIG. 2 is used, which may be implemented, for example, in the central control station 24 of the ground segment 20:

First, the SISMA value and the broadcast SISMA value for each satellite 14 monitored by the observation stations 22 are determined in Step S10. In the subsequent Step 12, it is checked whether the determined broadcast SISMA value of a satellite is greater than the provided threshold value. If not, the broadcast SISMA value with the integrity information will be transmitted in Step S16. If, however, the broadcast SISMA value is greater than the threshold value, the process enters a further checking branch, and in Step S14, it is checked whether the SISMA value determined for a satellite is greater than the threshold value. If, not, the threshold value is transmitted as the maximal value in Step S18 instead of the broadcast SISMA value with the integrity information. If the check in Step S14 indicates that the SISMA value is greater than the threshold value, the integrity information can be changed. For example, either a "not monitored" flag is set for the corresponding satellite, or an immediately applicable increase of the SISMA value for the corresponding satellite is transmitted to the users and/or use systems.

By means of the invention, underestimation of the integrity risk by a user and/or a use system can substantially be avoided because the user and/or the user system can be relatively certain that the SISMA value used by the ground segment or ground network is always smaller than the broadcast SISMA value. As long as the broadcast SISMA value is not increased because of the threshold value, the user and/or the use system will underestimate only the discontinuity risk by means of the invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

10 Navigation satellite system
12 space segment
14 satellites
16 navigation signals
18 use systems
20 ground segment
22 observation stations
24 central control station
26 transmission devices
30 integrity information
S10-S20 process steps

What is claimed is:

1. A process for integrity communication in a navigation satellite system, having i) a space segment with a plurality of satellites that emit navigation signals for reception and analysis by user systems for the position determination, and ii) a ground segment with a plurality of observation stations that monitor the satellites, wherein the ground segment controls the integrity communication so that it distributes integrity information concerning the satellites to user systems with the navigation signals, the integrity information for a satellite having a first SISMA (signal-in-space monitoring accuracy) value and a second broadcast SISMA value for the accuracy of the satellite monitoring by the ground segment, with the second broadcast SISMA value, in contrast to the first SISMA value, taking into account a failure of an observation station of the ground segment, and a threshold value for the second broadcast SISMA value being provided; said process comprising:
   transmitting the threshold value with the integrity information for a satellite instead of the second broadcast SISMA value when the latter exceeds the threshold value and the first SISMA value is lower than the threshold value for the satellite; and
   changing the integrity information to be transmitted as soon as the second broadcast SISMA value and the first SISMA value for the satellite each exceed the threshold value.

2. The process according to claim 1, wherein the change of the integrity information comprises marking a particular satellite as "not monitored" in the integrity information.

3. The process according to claim 1, wherein the change of the integrity information comprises increasing the first SISMA value for a particular satellite with the integrity information.

4. A system for integrity communication in a navigation satellite system having i) a space segment with a plurality of satellites that emit navigation signals for reception and analysis by user systems for the position determination, and ii) a ground segment with a plurality of observation stations which monitor the satellites; wherein:

the system is constructed for controlling the integrity communication such that it distributes integrity information concerning the satellites to user systems with the navigation signals;

the integrity information for a satellite has a first SISMA (signal-in-space monitoring accuracy) value and a second broadcast SISMA value for the accuracy of the satellite monitoring by the ground segment, the second broadcast SISMA value, in contrast to the first SISMA value, takes into account a failure of an observation station of the ground segment;

a threshold value is provided for the second broadcast SISMA value; and the system is configured to carry out the steps of, transmitting the threshold value with the integrity information for a satellite instead of the second broadcast SISMA value when the latter exceeds the threshold value and the first SISMA value is lower than the threshold value for the satellite; and changing the integrity information to be transmitted as soon as the second broadcast SISMA value and the first SISMA value for the satellite each exceed the threshold value.

* * * * *